(12) United States Patent  (10) Patent No.: US 8,805,895 B2
Moulckers et al.  (45) Date of Patent: *Aug. 12, 2014

(54) ADAPTIVE METHODOLOGY FOR UPDATING SOLUTION BUILDING BLOCK ARCHITECTURES AND DESIGNS

(75) Inventors: Ingrid M. Moulckers, Austin, TX (US); Sandra K. Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 841 days.

This patent is subject to a terminal disclaimer.

(21) Appl. No.: 12/112,017

(22) Filed: Apr. 30, 2008

(65) Prior Publication Data

US 2009/0276443 A1   Nov. 5, 2009

(51) Int. Cl.
  *G06F 7/00*  (2006.01)
(52) U.S. Cl.
  USPC ............................................... 707/803
(58) Field of Classification Search
  USPC .............. 707/803, 688, 690, 808, 999.101
  See application file for complete search history.

(56) References Cited

U.S. PATENT DOCUMENTS

| | | | |
|---|---|---|---|
| 6,341,291 B1 * | 1/2002 | Bentley et al. ........................ 1/1 |
| 6,501,995 B1 * | 12/2002 | Kinney et al. .................... 700/1 |
| 7,188,158 B1 * | 3/2007 | Stanton et al. ................ 709/220 |
| 7,315,826 B1 * | 1/2008 | Guheen et al. .................... 705/7 |
| 7,483,970 B2 * | 1/2009 | Anuszczyk et al. .......... 709/224 |
| 2002/0188434 A1 | 12/2002 | Shulman |
| 2003/0110253 A1 | 6/2003 | Anuszczyk et al. |
| 2003/0135840 A1 * | 7/2003 | Szabo et al. ................ 717/102 |
| 2003/0208456 A1 * | 11/2003 | Greenstein ....................... 707/1 |
| 2003/0217171 A1 * | 11/2003 | Von Stuermer et al. ...... 709/231 |
| 2004/0006500 A1 | 1/2004 | Guicciardi |
| 2005/0021348 A1 | 1/2005 | Chan et al. |
| 2005/0033588 A1 * | 2/2005 | Ruiz et al. ......................... 705/1 |
| 2005/0114152 A1 | 5/2005 | Lopez et al. |
| 2006/0168557 A1 | 7/2006 | Agrawal et al. |
| 2006/0248511 A1 | 11/2006 | Sanjar et al. |
| 2006/0282831 A1 | 12/2006 | Toeroe |
| 2007/0006222 A1 * | 1/2007 | Maier et al. ................... 717/174 |
| 2007/0044067 A1 | 2/2007 | Feldman |
| 2009/0012832 A1 * | 1/2009 | Greenstein ........................ 705/8 |
| 2009/0083274 A1 * | 3/2009 | Roden ............................. 707/10 |

OTHER PUBLICATIONS

Laveris et al., "building Enterprise Architectures with TOGAF," Telelogic White Paper, Jun. 23, 2005, pp. 1-36.
"Designing and Implementing an Effective Software Updating Solution," Macrovision Update Service, Nov. 2004, pp. 1-14.

* cited by examiner

*Primary Examiner* — Mohammed R Uddin
(74) *Attorney, Agent, or Firm* — John D. Flynn; Gregory K. Goshorn; Greg Goshorn, P.C.

(57) ABSTRACT

Provided is a method for the adaptive updating of building block architectures and designs in the event of a change to a component of the building block architecture. When a specific component of the architecture, or SBB, is replaced or modified, the metadata associated with the new or modified component is placed in a building block repository. The system captures or recognizes the event and automatically makes updates to dependent components of the specific component. Such updates may include, but are not limited to, a substitution or replacement of one component with another, generally if the replacement component is a better fit in the solution architecture than the original component. A new or updated system architecture is generated to reflect the replaced and/or modified components and the associated metadata. In the alternative, the system notifies an administrator to make specific changes in components rather than implementing the changes automatically.

21 Claims, 6 Drawing Sheets

ADAPTIVE METHODOLOGY FOR UPDATING SOLUTION BUILDING BLOCK ARCHITECTURES AND DESIGNS

BACKGROUND

1. Technical Field

The claimed subject matter relates generally to solution building blocks (SBBs) and, more specifically, to a method of providing automatic updates of collections of SBB components given changes to a specific SBB component.

2. Description of the Related Art

International Business Machines Corp. (IBM) of Armonk, New York has been at the forefront of new paradigms in business computing. For decades, the typical paradigm for business computing is that custom business applications had to be specifically designed and built for every business need. Of course, most custom business applications benefited from commonly-available, standardized applications. For example, a business that requires a database management system (DBMS) has several vendors from which to choose and each choice typically provides many of the same necessary features and interfaces to an application developer. However, a DBMS is only one of a multitude of possible components that may be required to implement a business solution.

There are several approaches to the development of a business software solution for a particular business. One approach focuses on specific components, or solution building blocks (SBBs), designed for an information technology (IT) environment. SBBs are preconfigured bundles of interoperable hardware and middleware that enable a business or infrastructure solution to be implemented. Examples of middleware include, but are not limited to, web servers, application servers and database servers. Examples of hardware include, but are not limited to, servers, data storage and associated system management software. In other words, SBBs are reusable assets that can be deployed in many different engagements for a diverse set of business and infrastructure solution offerings.

Typically, SBBs require additional integration to develop and deploy a complete solution. There exist architectures and associated tools designed to enable a developer to quickly assemble middleware and hardware components into SBBs. However, these existing technologies and methodologies do not provide adaptive functionality to enable automatic updates of the individual components of an SBB in the event of changes to the architecture or design of a targeted component.

Two terms that may be useful to clarify are the terms "application" and "solution." In some cases, an application solves several problems and as a result may be considered a solution. However, usually the term "solution" refers to an application because a solution solves a target set of problems. A solution is usually broader than an application because it resolves or addresses horizontal as well as vertical business problems. Solutions are typically delivered for the purpose of running a business end-to-end and not just focused on a portion (or application of the business). An application is applied to solve a set of problems for a business and might be applied to solve another set of problems of the same kind for another customer.

SUMMARY OF THE CLAIMED SUBJECT MATTER

Provided is a method for the adaptive updating of building block architectures and designs, such as a solution building block (SBB) architecture designs, in the event of a change to a component of the building block architecture. The remainder of the Specification focuses primarily on the relationship of the claimed subject matter to SBBs, although it should be understood that the disclosed technology is equally applicable to any building block architecture, many of which should familiar to those with skill in the computing arts.

Typically, an on-demand, custom solution to a user or business's computing needs has a specific architecture and a common metadata definition that defines attributes and dependencies among components. When a specific, or target, component of the architecture, or SBB, is replaced or modified, the metadata associated with the new or modified component is placed in a building block repository. The system then captures or recognizes the event and automatically makes updates to dependent components of the target component. Such updates may include, but are not limited to, a substitution or replacement of one component with another, generally if the replacement component is a better fit in the solution architecture than the original component. A new or updated building block architecture is generated to reflect the replaced and/or modified components and the associated metadata. In the alternative, the system notifies an administrator to make specific changes in components rather than implementing the changes automatically.

By employing the disclosed technology, a user, using a tool, such as Rational Solution Architecture, creates and/or manipulates an architecture model for a business solution. Attributes of individual components allow for the correlation of the components' architecture with metadata relating to the management of the lifecycle of the components. Modifications to dependent components and the architecture model are implemented. In other words, a new or updated architecture, which includes the new or updated components as associated by the metadata, is generated.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures.

DETAILED DESCRIPTION OF THE FIGURES

Although described with particular reference to a solution building block (SBB) architecture, the claimed subject matter can be implemented in any information technology (IT) system in which the automatic update and replacement of components is desirable. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for updating and modifying a solution architecture. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
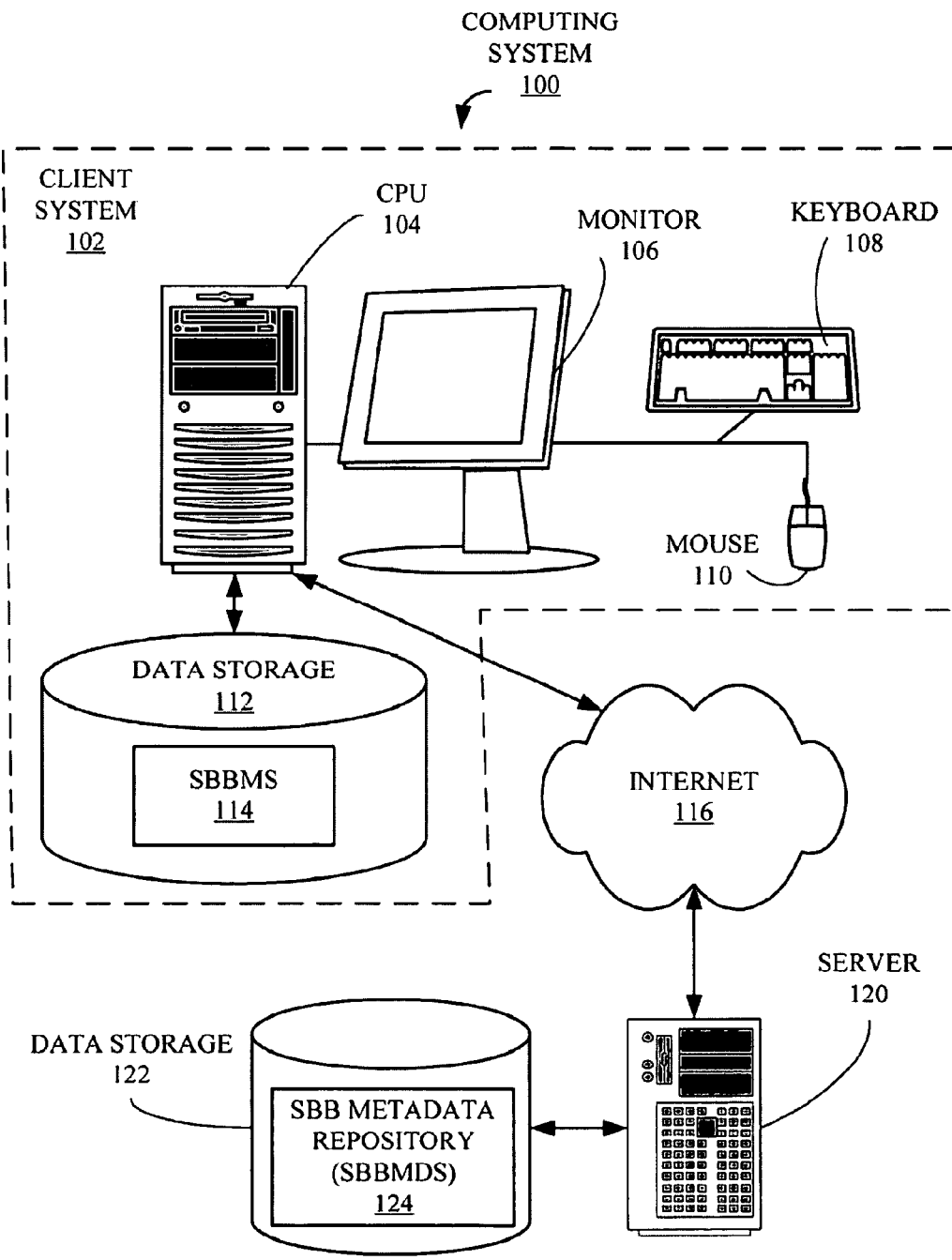
FIG. 1 is a block diagram of one example of a computing system that implements aspects of the claimed subject matter.

Turning now to the figures, FIG. 1 is a block diagram of one example of a computing system architecture 100 that implements aspects of the claimed subject matter. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing a solution building block monitoring system (SBBMS) 114. SBBMS 114 is described in more detail below in conjunction with FIGS. 2-6.

Client system 102 and CPU 104 are connected to the Internet 116, which is also connected to a server computer 120. Although in this example, CPU 104 and server 120 are communicatively coupled via the Internet 116, they could also be coupled through any number of communication mediums such as, but not limited to, a local area network (LAN) (not shown). Further, it should be noted there are many possible computing system configurations, of which computing system 100 is only one simple example. Server 120 is coupled to a data storage 122, which may either be incorporated into server 120 i.e. an internal device, or attached externally to server 120 by means of various, commonly available connection devices such as but not limited to, a universal serial bus (USB) port (not shown).

Data storage 122 stores a SBB metadata repository (SBBMDR) 124. SBBMDR 124 stores information about individual SBBs that are available for inclusion in a particular business solution and the relationship among the SBBs. In other words, SBBMDR 124 is a library of available SBBs that is maintained for the benefit of developers creating business solutions. Examples of information stored in SBB metadata repository 124 include what the individual SBBs are and version numbers. Also stored is information relating to how SBBs may be physically and logically arranged architecturally, how each SBB is constructed, the tools necessary to adapt, deploy, reconstruct and so on each, and any additional information necessary to utilize SBBs. The use of SBBS and SBBMDS 124 are described in more detail below in conjunction with FIGS. 2-6.

Figure 2:
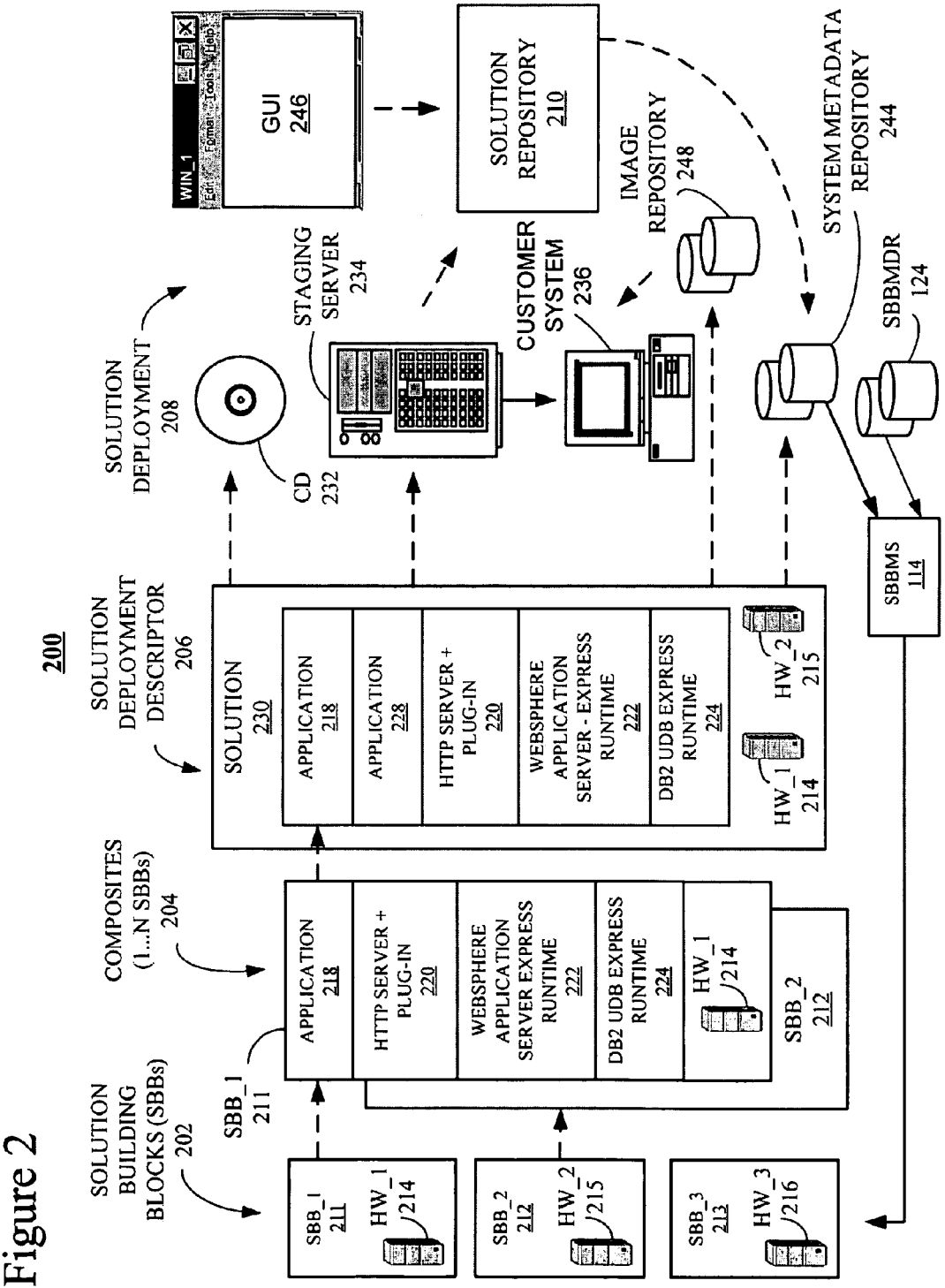
FIG. 2 is a block diagram of a solution development system architecture that employs the claimed subject matter, including a solution building block monitor system (SBBMS), first introduced in conjunction with FIG. 1.

FIG. 2 is a block diagram of solution development system 200 showing some exemplary components and business solution distribution elements. System 200 includes solution building blocks (SBBs) 202, composites (1 . . . N SBBs) 204, a solution deployment descriptor phase 206, a solution deployment phase 208 and a solution repository 210.

SBBs 202 includes several individual SBBs, specifically a SBB_1 211, a SBB_2 212 and a SBB_3 213. In this example, each of SBBs 211-213 include, in addition to middleware described below, a hardware component, or HW_1 214, HW_2 215 and HW_3 216, respectively. As described above in the Description of the Related Art, examples of SBBs 211-213 include middleware such as, but are not limited to, web servers, application servers and database servers. In addition, any particular SBB 211-213 may include other SBBs (not shown), i.e. nested SBBs. Examples of HW_1 214 include hardware such as, but are not limited to, servers, data storage and associated system management software. Each of components 211-214 may be selected for inclusion in a particular solution architecture and represent preconfigured, interoperable software and/or hardware bundles.

SBBMDS 114 (FIG. 1) is employed to implement the processes and methods described in more detail below in conjunction with FIGS. 3-6. SBBMDS 114 is employed to modify the selection of SBBs 211-213 when component requirements change. It should be understood that a typical system 200 would typically include more than three SBBs but that for the sake of simplicity, only SBBs 211-213 are illustrated. In this example, SBB_1 211 and SBB_2 212 have been selected for inclusion in composites 204.

SBB_1 211 is illustrated in more detail, showing some examples of possible core components, including an application 218, a HTTP server and associated plug-ins 220, a Websphere application server express runtime module 222, a DB2 universal database (UDB) express runtime module 224 and associated hardware HW_1 214 for executing components 218, 220, 222 and 224. Although not illustrated, SBB_2 212 also includes core components.

Solution deployment descriptor 206 represents a possible business solution 230. Included in solution 230 are the components of SBB_1 211, which was selected for composites 204, including application 218, components 220, 222 and 224, and HW_1 214. Also included in solution 230 are any components from SBB_2 212 minus any unnecessary duplicate components. Components from SBB_2 212 include an application 228 and HW_2 215. In this example, components such as components 220, 222 and 224 are part of both SBB_1 211 and SBB_2 212 and therefore are not duplicated in solution 230.

Solution deployment 208 illustrates some methods of distributing solution 230 to an eventual client or customer. Examples of such distribution techniques include, but are not limited to, a compact disk (CD) 232, which is mailed or otherwise delivered to the customer for installation on a customer system 236; and a staging server 234, from which customer system 236 can download solution 230. Those with skill in the computing arts should recognize that there are many possible delivery options in addition to CD 232 and staging server 234. Further, there are many possible customer configurations, of which customer system 236 is only one simple example.

In addition to a delivery to customer system 234, information related to solution 130 is stored as an architectural design in solution repository 210. Data stored in solution repository 210 is accessed and manipulated by an administrator using a graphical user interface 246. For the sale of efficiency, various screens of GUI 246 are stored in an image repository 248. In addition, images stored in image repository 248 may be accessed by administrators via customer system 236.

A system metadata repository 244 stores metadata for the system architecture stored in solution repository 210 as well as for each component included in business solution 230 (FIGS. 2 and 4) and represented by the system architecture. Like SBBMDS 114, system repository 244 stores SBB metadata, but, unlike SBBMDS 124 that stores information on every available SBB, system repository 244 stores only information associated with any SBB that has been incorporated into solution 230 and stored in solution repository 210.

Figure 3:
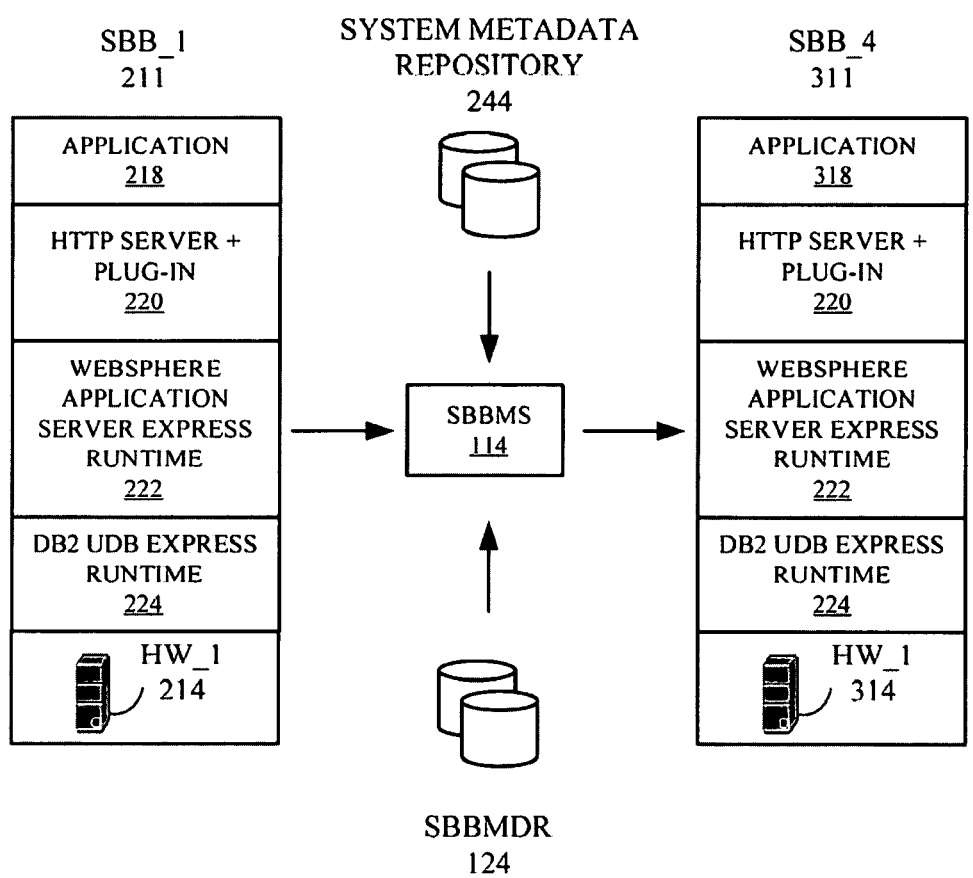
FIG. 3 is a block diagram of the SBBMS of FIGS. 1 and 2 showing the relationships among various components.

FIG. 3 is a block diagram of SBBMS 114 of FIGS. 1 and 2 showing the relationships among various additional components. SBB_1 211 (FIG. 2) is illustrated showing core components 218, 220, 222, 224 and 214 (FIG. 2). Information, or metadata, about SBB_1 211 is stored in both SBBMDR 124 (FIGS. 1 and 2) system metadata repository 244 (FIG. 2). As explained above in conjunction with FIGS. 1 and 2 metadata associated with SBB_1 211 is stored in system metadata repository 244 because 211 is incorporated into solution 230 and solution repository 210. Metadata associated with SBB_1 211 is stored in SBBMDR 124 because SBB_1 211 is an available component for a solution such as solution 230.

In this example, metadata associated with SBB_1 211 in repositories 124 and 244 are not consistent, i.e. changes have been made to SBB_1 211 after SBB_1 211 was incorporated into solution 230. Changes can be modification such as, but not limited to, upgrades, patches, changes to available or desirable hardware and so on. SBBCM 114 detects the differences between metadata stored in SBBMDR 124 and system metadata repository 244 and modifies SBB_1 114 so that solution 230 may also be updated if necessary.

Since SBB_1 114 may continue to be available as a component to any particular solution, SBBCM 114 generates another SBB, i.e. a SBB_4 311. SBB_4 311 includes several of the same components as SBB_1 211, specifically components 218, 220, 222 and 224. However, application 218 is replaced by an application 318 and HW_1 214 is replaced by different hardware, or HW_4 314. In this example, application 218 has been replaced by an upgrade, or application 318, and the upgrade necessitates a hardware substitution, or a replacement of HW_1 214 by HW_4 314.

Figure 4:
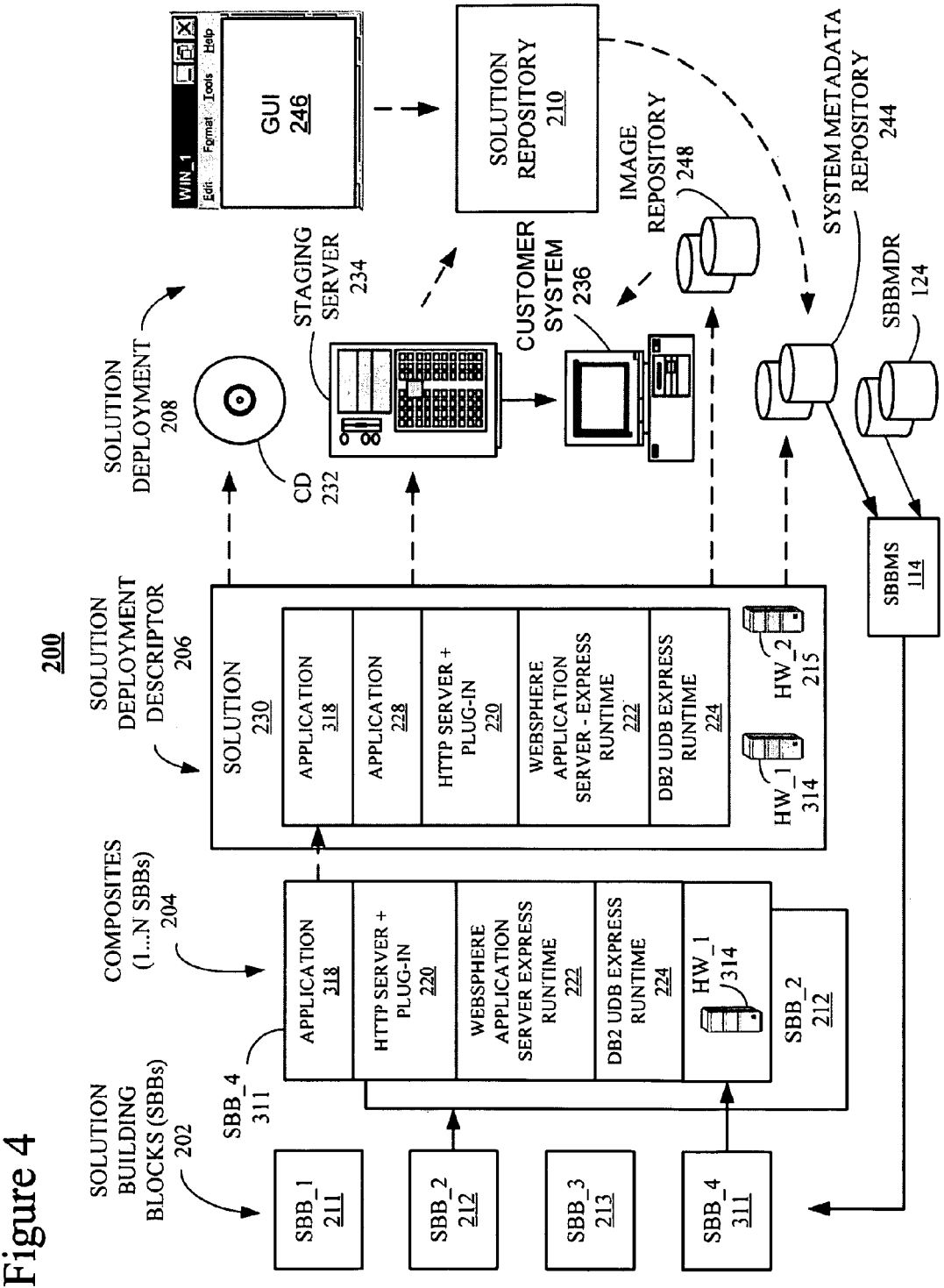
FIG. 4 is a block diagram showing the update of the solution development architecture of FIG. 1 as implemented by the SBBMS of FIGS. 1-3.

FIG. 4 is a block diagram showing the update of a particular solution as implemented by the SBBMS 114 of FIGS. 1-3. FIG. 4 includes most of the components and stages described above in conjunction with FIG. 2. Components and stages duplicated from FIG. 2 are not described again in conjunction with FIG. 4. In this example, in addition to SBBs 211-213, solution build blocks 202 (FIG. 2) includes SBB_4 311, introduced above in conjunction with FIG. 3. As explained above, SBB_4 311 is an upgrade of SBB_1 211 that necessitated an upgrade from HW_1 214 to HW_4 314.

In this example, the upgrade is propagated through composites 204, solution deployment descriptor 206, solution deployment 208 and solution repository 210. In addition, system metadata repository 244 is updated to reflect the modifications to the system architecture.

The detection that the upgrade is available, the generation of SBB_4 311 and the generation of a modified solution building blocks phase 202 are implemented by SBBMS 114. Processes associated with the detection and upgrade are executed by SBBMS 114 and described below in conjunction with FIGS. 5 and 6.

Figure 5:
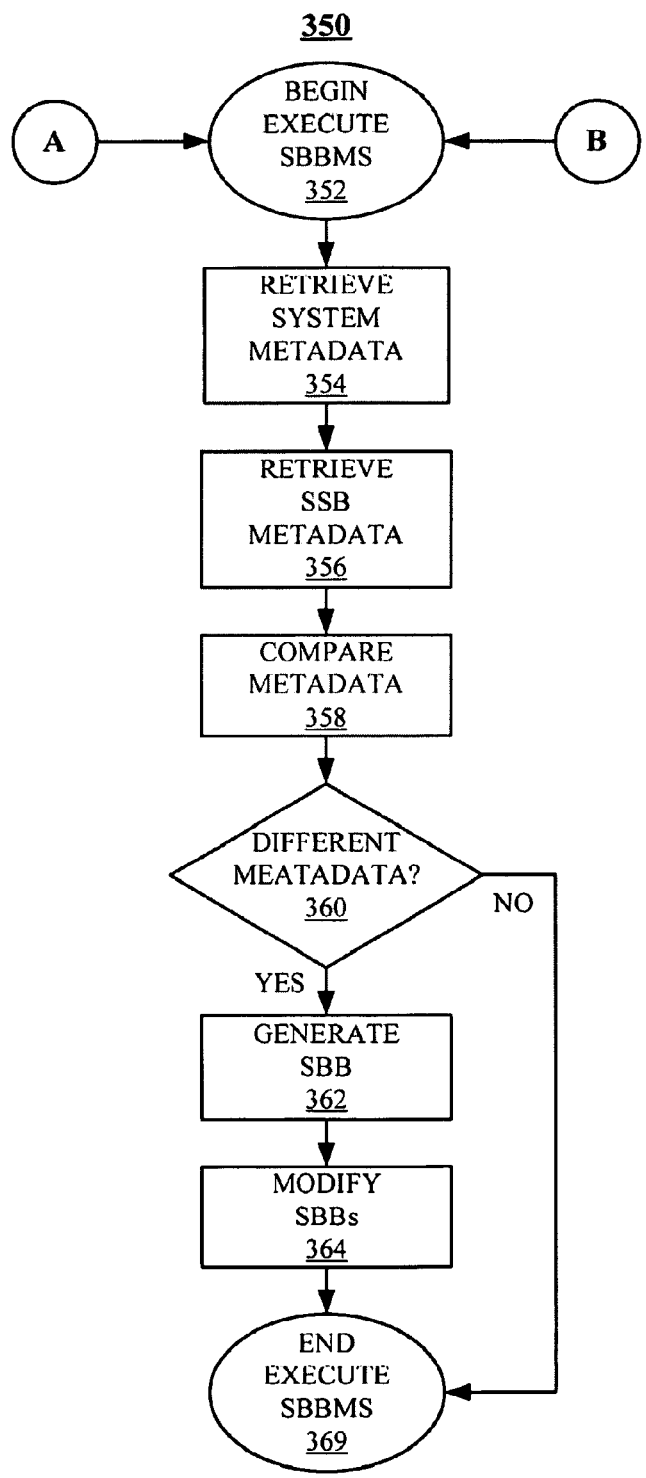
FIG. 5 is a flowchart of an Execute SBBMS process that implements the claimed subject matter.

FIG. 5 is a flowchart of an Execute SBBMS process 350 that implements the claimed subject matter. In the description below, the execution of process 350 is occurring after system 200 is configured as described in FIG. 2 and before as described in FIG. 4. In other words, process 350 is described as implementing the changes in the solution architecture from those describe in FIG. 2 to those in FIG. 4. Process 350 is stored in data storage 112 (FIG. 1) and executed on CPU 104 (FIG. 1) of client system 102 (FIG. 1).

It should be noted that process 350 may be initiated in a number of ways, although for the sake of simplicity only two (2) are shown, i.e. an initiation event A and an initiation event B. In this example, event A represents a periodic check of the system, initiated either by a system administrator or automatically generated by a system timer set to a configurable parameter. Event B represents a modification to the system architecture as represented in solution repository 210 (FIGS. 1 and 3). The particular manner of initiation is not specified in this example but could be the result of event A, event B or some other event.

Process 350 starts in a "Begin Execute SBBMS" block 352 and proceeds immediately to a "Retrieve System Metadata" block 354. During block 354, process 350 retrieves metadata from system metadata repository 244 (FIGS. 2 and 4). As explained above in conjunction with FIG. 2, repository 244 stores metadata associated with software and hardware components currently installed in solution repository 210 (FIGS. 2 and 4) as part of the business solution 230 (FIGS. 2 and 4). During a "Retrieve SBB Metadata" block 356, process 350 retrieves metadata associated with SBB building blocks 202 (FIGS. 2 and 4), stored in SBBMDR 124 (FIGS. 1-4).

During a "Compare Metadata" block 358, process 350 compares the metadata retrieved during block 354 with the metadata retrieved during block 356 to determine whether or not any differences exist. A difference may exist, for example, if a particular SBB, such as SBB_1 214 (FIGS. 2 and 4), has been upgraded, i.e. a newer version has been released. The version number of the various components is typically stored in conjunction with the metadata. Those with skill in the computing arts should appreciate that are many reasons for components in solution repository 210 to differ from the available SBBs 202. Another example of a difference in metadata repositories 124 and 244 occurs if a user has modified the system architecture stored in conjunction with solution repository 210. For example, if a system administrator has updated system security requirements for a middleware or application component in response to certain business requirements, the architectural design may also be modified.

Such a modification would cause an update in the SBB metadata repository 244 that would be detected by process 350.

During a "Different Metadata?" block 360, process 350 determines whether or not a difference has been detected during block 358. If so, process 350 proceeds to a "Generate SBB" block 362. During block 358, a new SBB is created, as explained above in conjunction with FIG. 3. The process of generating the SBB is described in more detail below in conjunction with FIG. 6.

During an "Modify SBBs" block 364, the SBB generated during block 362 is added to solution building blocks 202 (FIGS. 2 and 4). Finally, once the modified SBB architecture has been generated during block 364, or, during block 360, process 350 has determined that metadata repositories 244 and 124 are consistent with each other, control proceeds to an "End Execute SBBMS" block 369 in which process 350 is complete.

Figure 6:
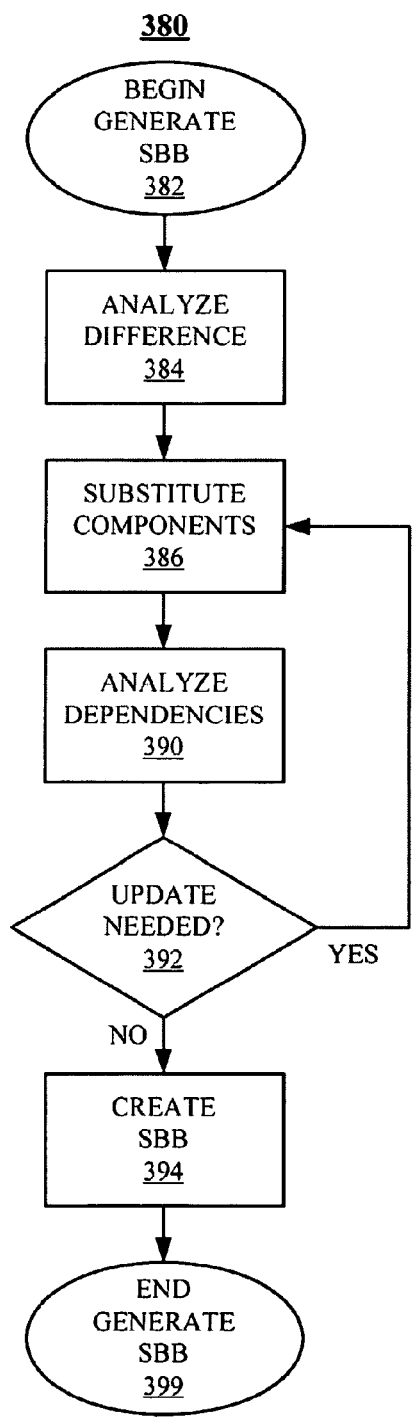
FIG. 6 is a flowchart of Modify Architecture process that implements one aspect of the Execute SBBMS, introduced in FIG. 5

FIG. 6 is a flowchart of Generate SBB process 380 that implements one aspect of Execute SBBMS process 350, introduced in FIG. 5. Process 380 corresponds to Generate SBB block 362 (FIG. 5) of process 350. As part of process 350, process 380 is also stored in data storage 112 (FIG. 1) and executed on CPU 104 (FIG. 1) of client system 102 (FIG. 1).

Process 380 starts in a "Begin Generate SBB" block 382 and proceeds immediately to an "Analyze Difference" block 384. During block 384, process 380 analyzes the differences detected during Different Metadata? Block 360 (FIG. 5) of process 350. Types of thing analyzed include, but are not limited to, superseded version numbers or entirely different components that have been substituted for others in either system metadata repository 244 (FIGS. 2 and 4) and/or SBBMDR 124 (FIGS. 1-4).

During a "Substitute components" block 386, the architecture design stored in solution repository 230 is modified to reflect the updated component or components. During an "Analyze Dependencies" block 390, process 380 determines if substitutions implemented during block 386 have created a need to modify additional components. As described above, metadata repositories 244 and 124 include information on dependencies among components. For example, process 380 may determine that a substitution of SBB_1 211 (FIG. 2-4) with SBB_4 311 (FIG. 3 and 4) requires that associated hardware HW_1 214 (FIGS. 2-4) must be replaced with HW_4 314 (FIGS. 3 and 4).

During an "Update Needed?" block 392, process 380 determines based upon the analysis executed during block 390 whether or not the component substitutions implemented during block 386 have created dependencies in other components that need to be addressed. If additional component substitutions are required, process 380 returns to block 386 during which the substitutions are implemented and processing continues as described above. If, during block 392, process 380 determines that additional substitutions are not required, control proceeds to an "End Generate SBB" block 399 in which process 380 is complete.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method, comprising:
   detecting a modification to an architecture of a first computing component stored in a building block repository;
   generating, in response to the detection of the modification and based upon the modified architecture, a second computing component as a replacement to the first computing component;
   storing the second computing component in the building block repository
   correlating the first component to a third computing component incorporated into a solution architecture; and
   updating the solution architecture by replacing the third component with the second component.

2. The method of claim 1, further comprising;
   identifying a fourth component incorporated into the solution architecture that has a dependency on the third component;
   determining whether or not functionality of the fourth component is affected by the replacement of the third component; and
   if the dependency is affected, identifying a suitable replacement component for the fourth component to resolve the dependency; and
   replacing the fourth component with the replacement component.

3. The method of claim 1, wherein the first, second and third components each include a software element.

4. The method of claim 1, wherein the first, second and third components each include a hardware element.

5. The method of claim 1, wherein the first, second and third components are solution building block (SBB) components.

6. The method of claim 1, further comprising analyzing metadata associated with the first and third components to determine any modification or correlation.

7. The method of claim 1, further comprising storing the updated solution architecture in a business solution repository.

8. A system, comprising;
   a processor;
   a memory coupled to the processor; and
   logic, stored on the memory for execution on the processor, for:
      detecting a modification to an architecture of a first computing component stored in a building block repository;
      generating, based upon the modified architecture, a second computing component as a replacement to the first computing, component;
      storing the second computing component in the building block repository;
      correlating the first component to a third computing component incorporated into a solution architecture; and
      updating the solution architecture by replacing the third component with the second component.

9. The system of claim 8, further comprising logic, stored on the memory for execution on the processor, for:
   identifying a fourth component incorporated into the solution architecture that has a dependency on the third component;
   determining whether or not functionality of the fourth component is affected by the replacement of the third component; and
   identifying a suitable replacement component for the fourth component to resolve the dependency; and replacing the fourth component with the replacement component.

10. The system of claim 1, wherein the first, second and third components are each software elements.

11. The system of claim 1, wherein the first, second and third components are each hardware elements.

12. The file system of claim 1, wherein the first, second and third components are each solution building block (SBB) components.

13. The system of claim 1, further comprising logic, stored on the memory for execution on the processor, for analyzing metadata associated with the first and third components to determine any modification or correlation.

14. The system of claim 1, further comprising logic, stored on the memory for execution on the processor, for storing the updated solution architecture in a business solution repository.

15. A computer programming product comprising:
a memory; and
logic, stored on the memory for execution on a process, for:
detecting a modification to an architecture of a first computing component stored in a building block repository;
generating, based upon the modified architecture, a second computing component as a replacement to the first computing component;
storing the second computing component in the building block repository;
correlating the first component to a third computing component incorporated into a solution architecture; and
updating the solution architecture by replacing the third component with the second component.

16. The computer programming product of claim 15, further comprising logic, stored on the memory for execution on the processor, for:
identifying a fourth component incorporated into the solution architecture that has a dependency on the third component;
determining whether or not functionality of the fourth component is affected by the replacement of the third component; and
identifying a suitable replacement component for the fourth component to resolve the dependency; and
replacing the fourth component with the replacement component.

17. The computer programming product of claim 15, wherein the first, second and third components each include a software element and a hardware element.

18. The computer programming product of claim 15, wherein the first, second and third components are solution building block (SBB) components.

19. The computer programming product of claim 15, further comprising logic, stored on the memory for execution on the processor, for analyzing metadata associated with the first and third components to determine any modification or correlation.

20. The computer programming product of claim 15, further comprising logic, stored on the memory for execution on the processor, for storing the updated solution architecture in a business solution repository.

21. A method, comprising:
detecting a modification to an architecture of a first computing component stored in a building block repository;
generating, in response to the detection of the modification and based upon the modified architecture, a second computing component as a replacement to the first computing component;
storing the second computing component in the building block repository;
correlating the first component to a third computing component incorporated into a solution architecture;
updating the solution architecture by replacing the third component with the second component;
identifying a fourth component incorporated into the solution architecture that has a dependency on the third component;
determining whether or not functionality of the fourth component is affected by the replacement of the third component; and
if the dependency is affected, identifying a suitable replacement component for the fourth component to resolve the dependency;
replacing the fourth component with the replacement component;
analyzing metadata associated with the first and third components to determine any modification or correlation; and
storing the updated solution architecture in a business solution repository.

* * * * *